United States Patent [19]

Newswanger

[11] 3,845,565

[45] Nov. 5, 1974

[54] ANGLE MEASURING DEVICE

[76] Inventor: Paul S. Newswanger, 1401 Vermont Ave., Lancaster, Pa. 71200

[22] Filed: Aug. 20, 1971

[21] Appl. No.: 173,597

[52] U.S. Cl.................. 33/174 R, 33/1 N, 33/76 R
[51] Int. Cl........................... G01b 5/24, G01b 3/56
[58] Field of Search.. 33/1 N, 174 R, 174 C, 174 N, 33/76 R, 97, 201, 180 R

[56] References Cited
UNITED STATES PATENTS

| | | | |
|---|---|---|---|
| 166,912 | 8/1875 | Young | 33/1 N |
| 890,257 | 6/1908 | Beeve | 33/75 R |
| 925,674 | 6/1909 | Austin | 33/282 |
| 2,189,371 | 2/1940 | Stagl | 33/75 R |

FOREIGN PATENTS OR APPLICATIONS

| | | | |
|---|---|---|---|
| 449,148 | 9/1927 | Germany | 33/281 |
| 10,374 | 5/1906 | Great Britain | 33/75 R |

Primary Examiner—Louis R. Prince
Assistant Examiner—Richard R. Stearns
Attorney, Agent, or Firm—Karl L. Spivak, Esq.

[57] ABSTRACT

A device for measuring and setting angles having a longitudinally extending swinging arm connected by a pivotal mounting to a fixed support. The arm is pivotable from a first position to a second position through an angle to be measured or set. The swinging arm may have a parallel slot or a longitudinally extending tapered slot which is spaced from the pivotal mounting and which is tapered in a direction away from the pivotal mounting. A slide is mounted for movement on a track and has a pin connected thereto, a portion of which extends into the longitudinally extending tapered slot. The portion of the pin extending into the slot is semi-circular in cross-section and has an upper planar surface terminating at opposed edges which engage opposite longitudinally extending walls of the tapered slot throughout the entire movement of the arm from its first position to its second position. A pointer is also connected to the slide and overlies an angle measuring scale. Movement of the slide pivots the swinging arm through interaction of the pin connection within the longitudinally extending slot. The pointer moves over the scale to provide a measurement of movement which is determinative of the angle to be measured or set.

6 Claims, 13 Drawing Figures

PATENTED NOV 5 1974  3,845,565
SHEET 1 OF 3
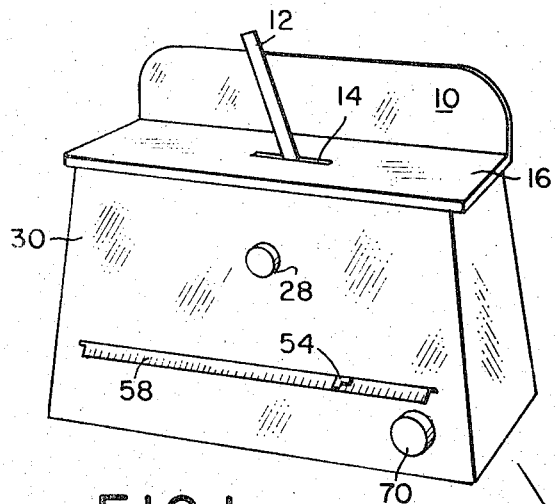
FIG.1
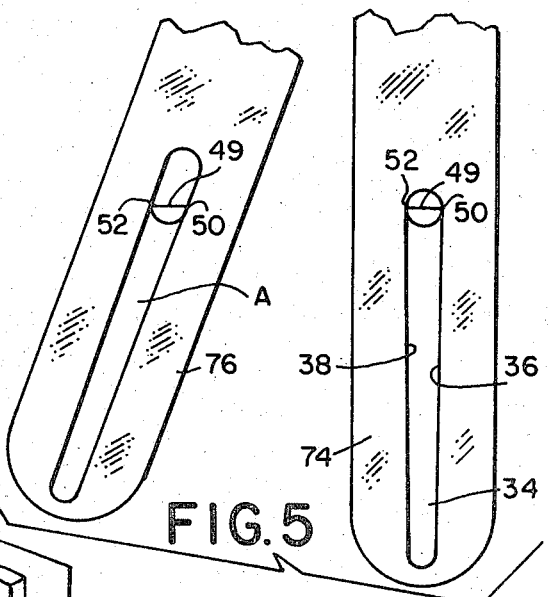
FIG.5
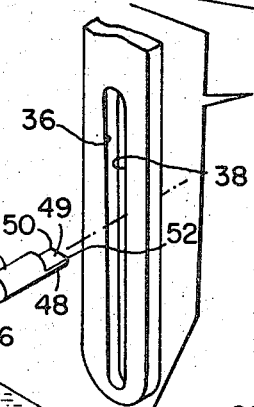
FIG.4
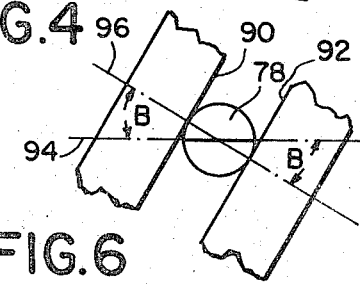
FIG.6
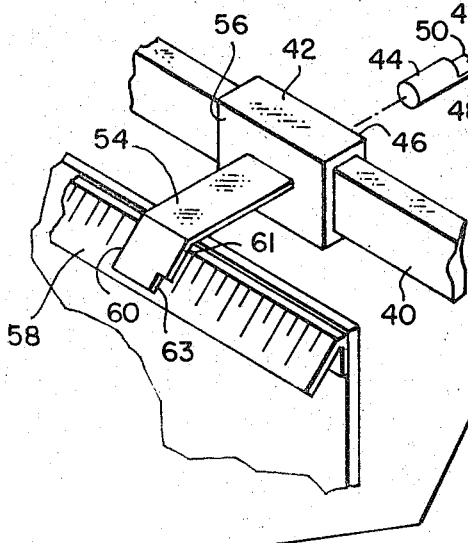
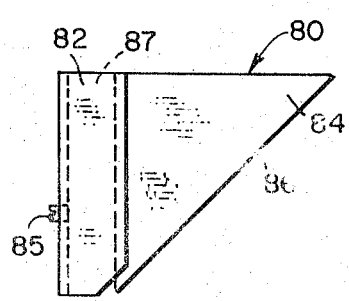
FIG.8
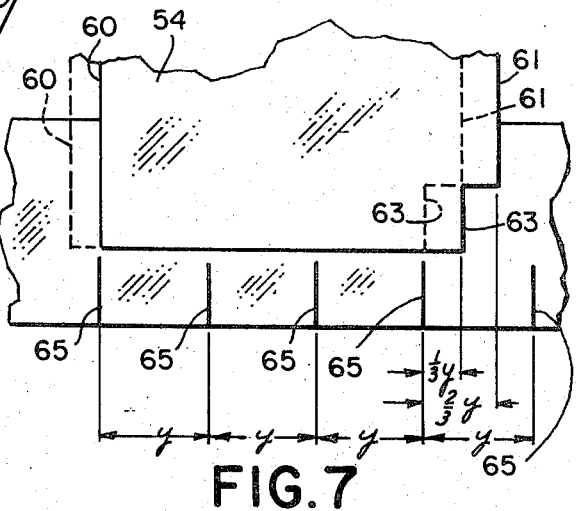
FIG.7
INVENTOR.
PAUL S. NEWSWANGER
BY Karl L. Spivak
ATTORNEY.

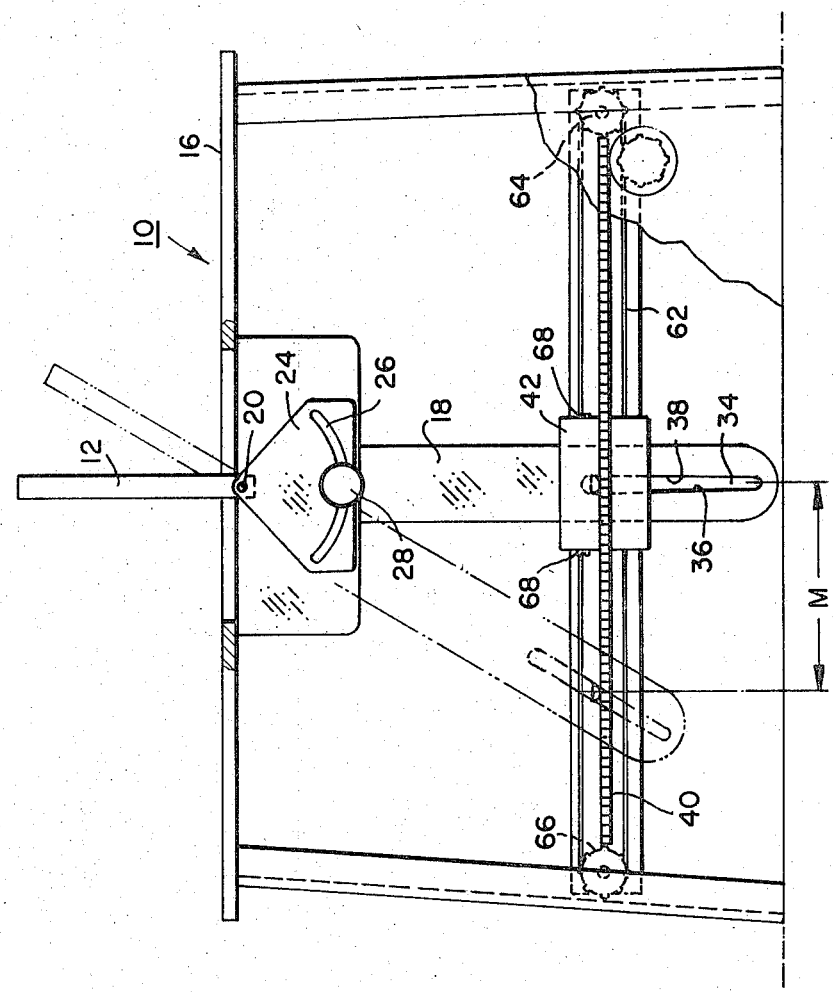
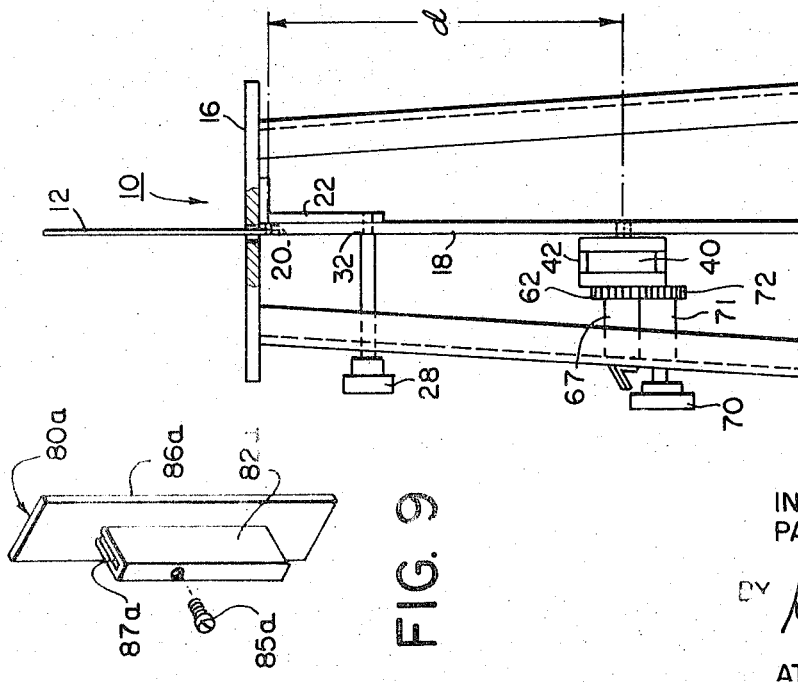

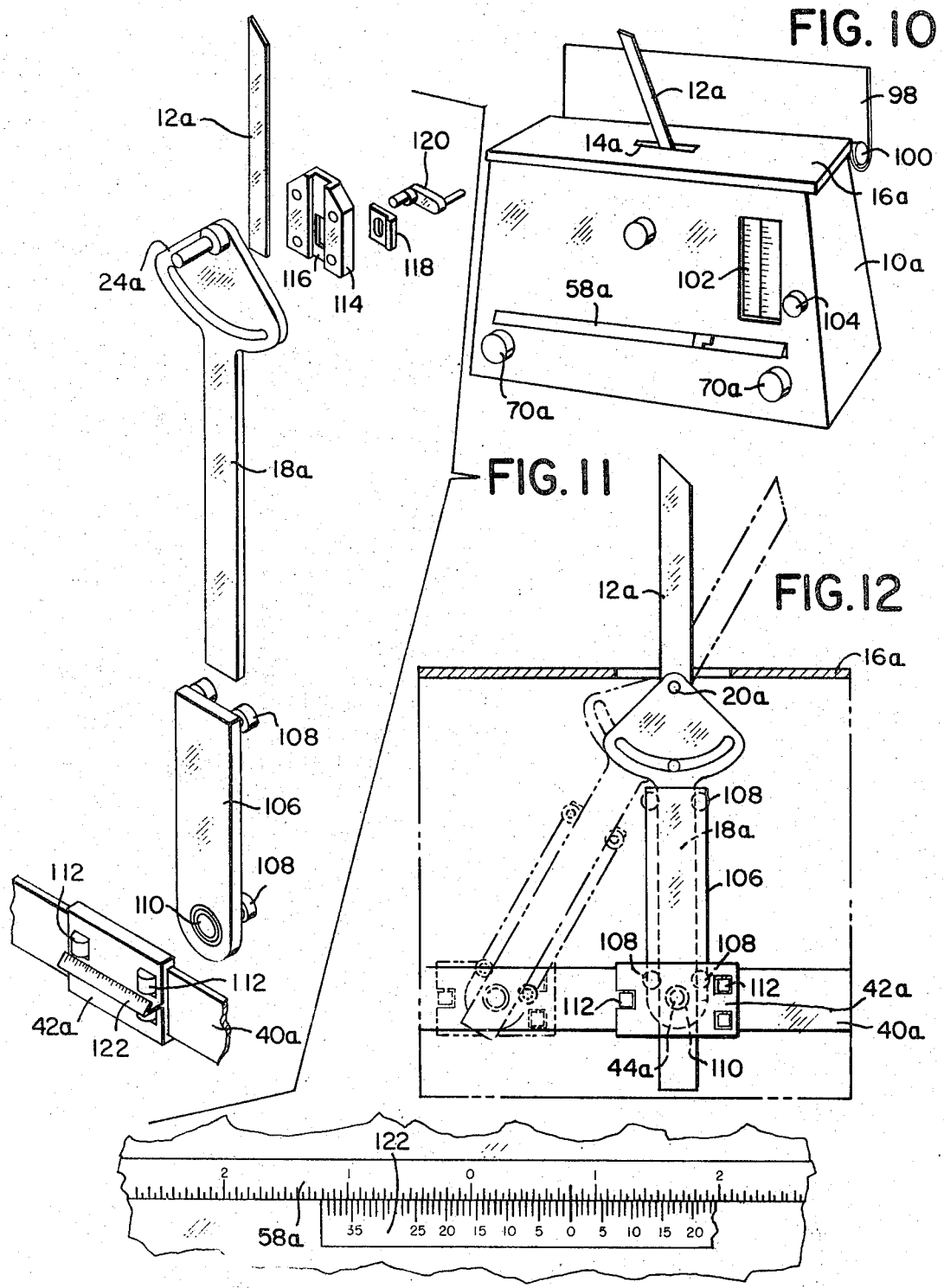

ANGLE MEASURING DEVICE

BACKGROUND OF THE INVENTION

Prior art devices which utilize a swinging arm pivoted near one end for measuring angles are known. Also, devices which require the use of trigonometric analysis for calculating desired measurements are known. Many of these prior art devices for measuring and setting angles do not have the high degree of accuracy required for many applications. Also, many of the prior art constructions are difficult to use, and expensive to manufacutre.

Devices for measuring angles with a high degree of accuracy are required in measuring the angular relationship of faces on precious gems. Also, extreme accuracy is desirable in setting angles of tools and other equipment. For example, extremely accurate angle setting and measuring devices are required for use in setting the taper on a taper attachment of a lathe, and for setting the angle of milling machine tools.

SUMMARY OF THE INVENTION

The device of this invention has a unique swinging arm arrangement for measuring and setting angles with precise accuracy. A longitudinally extending swinging arm is connected by a pivotal mounting to a fixed support. The movement of the swinging arm from a first position to a second position, which is determinative of the angle to be measured or set, is determined by the movement of a pointer associated with the swinging arm which moves over an elongated indicating means in response to the pivotal movement of the swinging arm. In the preferred embodiment of the invention, the pointer is connected to a slide which is mounted for movement on a track. A pin connects to a slide and a portion of the pin projects into a longitudinally extending slot extending through the swinging arm. The portion of the pin extending into the longitudinally extending slot is semi-circular in cross section and is upwardly defined by a planar surface which terminates at opposed edges which opposed longitudinal walls of the slot.

The walls of the slot are tapered in a direction away from the pivotal mounting and the angle of taper is precisely designed such that the opposed edges of the planar surface of the pin engage the walls throughout the entire pivotal movement of the swinging arm from the first position to the second position. The opposed lines of contact between the opposite edges of the planar surface of the pin and the side walls of the tapered slot lie in the same plane throughout the entire pivotal movement of the arm from the first position to the second position. The device is manufactured such that the perpendicular distance "d" in a first direction from the center of the pivotal mounting of the swinging arm to the planar surface of the portion of the pin extending into the longitudinal slot is predetermined. The movement of the pointer over the scale gives a direct reading of the movement "M" of the swinging arm in the plane through the planar surface of the pin in a direction perpendicular to the first direction. The angular movement of the pivotal swinging arm can then be calculated by utilizing trigonometric tables, since the angle of movement "A" $= \tan^{-1} M/d$. The pointer of the device has a forward measuring edge and a rearward edge with a stepped surface formed therein for forming a vernier calibration.

The swinging arm has an upper segment which is provided with an arcuate slot extending therethrough for locking purposes. A clamping screw extends through the face plate of the device, through the arcuate slot and threadedly engages into the fixed support to which the swinging arm is pivotally mounted. The stem of the clamping screw has a flange for engaging the walls of the upper segment surrounding the arcuate slot to clamp the upper segment against the fixed support to firmly lock the swinging arm in any desired angular position.

In one preferred embodiment of this invention, a longitudinally extending protractor blade is connected to the swinging arm with its longitudinal axis in direct alignment with the longitudinal axis of the swinging arm. The protractor blade extends outwardly through an elongated slot in a supporting surface of the device and has opposed edges which are parallel to its longitudinal axis and which are utilized for measuring angles of articles placed on the supporting surface. A supplemental blade is provided for use with the protractor blade for extending the range of angles which can be measured and set. Other supplemental blades can also be attached to the protractor blade.

Opposite ends of a drive chain are connected to opposite sides of the slide to which the pointer is connected and the chain is disposed about spaced, rotatably mounted sprockets in the form of a closed loop. A hand operated dial extends outwardly through the face plate of the device, and has a sprocket wheel connected thereto for engaging the chain on the outside of the closed loop. Rotating the dial in a clockwise direction will result in a clockwise rotation of the swinging arm about its pivot. Counterclockwise rotation of the swinging arm dial will result in a counterclockwise rotation of the swinging arm.

It is an object of this invention to provide an improved device for measuring and setting angles with a high degree of accuracy of the type set forth.

It is a further object of this invention to provide a device which is extremely easy to operate and which utilizes a swinging arm that can be locked in any rotatable position.

It is a further object of this invention to provide a device which has a unique interconnection means between a swinging arm, which is used to measure and set angles, and an indicating means for indicating the distance of movement of the arm.

It is further an object of this invention to provide a device which utilizes the movement of a swinging arm to indicate the angles to be measured or set in terms of trigonometric functions.

It is another object of this invention to provide a novel angle measuring device that is capable of easily determining the amount of material to be removed to machine the desired correct angle on a work piece.

It is another object of this invention to provide a novel angle measuring device incorporating a support platform for holding a work piece and light means carried behind the platform to visually indicate the proper placing of a protractor blade against an angular work piece for angle measuring purposes.

It is another object of this invention to provide a novel angle measuring machine that is rugged in construction, inexpensive in manufacture and extremely accurate in operation.

Other objects and a fuller understanding of the invention will be had by referring to the following description and claims of a preferred embodiment, taken in conjunction with the accompanying drawings, wherein like reference characters refer to similar parts throughout the several views and in which:

BRIEF DESCRIPTION OF THE DRAWINGS

FIG. 1 is an isometric view of the device of this invention with a protractor blade extending outwardly through an elongated slot in the support platform.

FIG. 2 is a front elevation view of the device of this invention with the face plate of the casing partially broken away to show internal construction details.

FIG. 3 is an end elevation view of the device of this invention with the end plate of the casing removed.

FIG. 4 is a partial, exploded, isometric view showing the relationship of various components of the device of this invention.

FIG. 5 is a partial, enlarged, rear elevation view showing the relationship between the swinging arm and the interconnection pin in two positions of the swinging arm.

FIG. 6 is a partial, rear elevation view showing a prior art interconnection system.

FIG. 7 is an enlarged, fragmentary view of the pointer and scale.

FIG. 8 is a front elevation view of a supplemental blade for use with the angle measuring and setting device.

FIG. 9 is a isometric view of a second supplemental blade for use with the angle measuring and setting device.

FIG. 10 is a perspective view of a modified angle measuring device.

FIG. 11 is an enlarged, exploded perspective view of the operating parts of the embodiment of FIG. 10.

FIG. 12 is an enlarged, partial front elevational view of the modification of FIG. 10, partially broken away to show internal construction details.

FIG. 13 is a detailed, fragmentary view of the reading scale of modification of FIG. 10.

DESCRIPTION OF THE PREFERRED EMBODIMENT OF THE INVENTION

Although specific terms are used in the following description for the sake of clarity, these terms are intended to refer only to the particular structure of my invention selected for illustration in the drawings, and are not intended to define or limit the scope of the invention.

The angle setting and measuring device 10 of this invention has a longitudinally extending protractor blade 12 extending through a slot 14 in a support platform 16 which forms the upper closure of the device (FIGS. 1 and 2) and which is supported by a rigid frame. The lower end of the protractor blade is fixed to a swinging arm 18 which is pivotally mounted by a pivot pin 20 to an L-shaped support member 22 secured to the underside of the support platform 16 (FIGS. 2 and 3). The longitudinal axis of the protractor blade is in alignment with the longitudinal axis of the swinging arm and extends through the center of the pivot pin 20 (FIG. 2). The swinging arm has an upper segment 24 with an arcuate slot 26 formed therethrough (FIG. 2). A clamping screw 28 extends through a face plate 30 of the device 10 and has a stem which is provided with an annular flange 32 (FIGS. 1 and 2). The annular flange engages regions of the upper segment 24 of the swinging arm 18 which are adjacent to the arcuate slot 26 to clamp the swinging arm 18 in any desired position.

An elongated tapered slot 34 axially extends in a longitudinal direction in the lower section of the swinging arm 18. This tapered slot 34 is defined in part by longitudinally extending wall sections 36, 38 (FIGS. 2 and 5). A slide support bar 40 is mounted by any suitable means (not shown) to the frame of the device 10 and a sliding member 42 is mounted on said support bar 40 (FIGS. 2 and 4).

An interconnecting pin 44 firmly mounts against rotation to the back wall 46 of the slide member 42 (FIG. 4) in any suitable, well known manner. The interconnecting pin 44 hass a rear section 48 of semi-circular cross section and this rear section extends into the tapered slot 34 of the swinging arm 18. The rear section 48 of the pin is defined, in part, by an upper planar surface 49 which terminates at opposite edge surfaces 50, 52 (FIGS. 4 and 5). The edge surfaces 50, 52 and the longitudinally extending walls 36, 38 msut be precisely machined so that the edge surfaces will continuously engage the longitudinally extending walls 36, 38 in all angular positions of the swinging arm. Irregularities in other portions of the interconnecting pin 44 can exist without effecting the accuracy of the device 10, since only the edge surfaces 50, 52 engage the longitudinal walls of the tapered slot 34. The unique manner in which the tapered slot 34 interacts with the rear section 48 of the interconnecting pin 44 represents an important aspect of the present invention, and assures that the movement of the sliding member 42 is precisely and accurately transmitted to the swinging arm 18. Furthermore, it is relatively easy to precisely machine the rear section of the pin to form the edge surfaces 50, 52 and the planar surface 49. It is also easy to assemble the device such that a predetermined perpendicular distance $d$ (FIG. 3) can be set between the center of the pivot pin 20 and the planar surface 49 for a purpose which will be hereinafter explained.

Referring to FIG. 6, the deficiencies of utilizing an interconnecting pin having a circular cross-sectional rear section in conjunction with an elongated slot having parallel side walls will be explained. The plane defined by opposed lines of contact between a circular pin 78 and parallel side walls 90, 92 of the slot is always perpendicular to the longitudinal axis of the swinging arm. The line 94, represents the plane defined by the opposed lines of contact between pin 78 and side walls 90, 92 when the swinging arm is in a substantially vertical position (FIGS. 1 and 2). The line 96 represents the plane defined by the lines of contact between the pin 78 and the side walls 90, 92 when the swinging arm is in a position pivoted from the vertical. All portions of the outer surface of the pin 78 between the planes 94 and 96 (indicated by the angle B) will rotatively contact the side walls 90, 92 as the swinging arm 18 moves from its substantially vertical position to the angular position shown in FIG. 6. Therefore, the outer surface of the pin 78 between the planes 94 and 96 must be precisely machined such that it will be in engagement with the side walls 90, 92 of the elongated slot throughout the entire pivotal movement of the swinging arm 18. If there is any error in machining the outer surface of the pin 78 in the regions defined between planes 94, 96, the motion transmitted to the pin 78 by movement of the sliding member 42 will be inaccurate. Furthermore, the only portion of the circular pin 78 which moves precisely the same transverse distance as the sliding member 42 is its center. Therefore, the distance $d$ must be precisely set between the center of the circular pin 78 and the center of the pivot pin 20 when the swinging arm and protractor blade are precisely in a vertical position. It is much easier to set the predetermined distance $d$ between the center of the pivot pin and a planar surface, such as surface 49, than it is to set the distance $d$ between the center of pivot pin 20 and the center of a circular pin.

Referring now to FIGS. 1, 2 and 4, a pointer 54 is connected to the front wall 56 of the sliding member 42 and extends through an opening in the face plate 30. The pointer 54 overlies an elongated scale 58 which is connected to the face plate 30. The pointer has a forward measuring edge 60 movable over the scale for measuring transverse displacement of the swinging arm, either to the right or to the left of its substantially vertical position shown in FIG. 2. If desired, a magnifying glass can be fastened to the pointer to facilitate the reading of the transverse displacement.

The scale 58 is calibrated to the right and to the left of center, with the center constituting the zero point of both the right hand and left hand calibrations. By calibrating the scale to the right and to the left of center, the transverse displacement of the swinging arm from its substantially vertical position in FIG. 2 can be determined by directly reading the scale where the forward measuring edge 60 of the pointer is aligned.

A chain 62 is trained about spaced sprocket wheels 64, 66 (FIG. 2). The spaced sprocket wheels 64, 66 are mounted in bearing blocks 67 (only one being shown in FIG. 3) which are mounted to the face plate 30 of the device. The free ends of the chain 62 are connected to the sliding member 42 by any suitable means, such as screws 68 (FIG. 2). The chain 62 is rotated by a hand operated dial 70 extending through the face plate 30 (FIGS. 1 and 3) to impart sliding movement to sliding member 42. The hand operated dial 70 is mounted through a bearing block 71 (FIG. 3) to a chain drive sprocket wheel 72. This chain drive sprocket wheel 72 engages the chain on the outside of a chain loop. The reason for mounting the sprocket wheel on the outside of the chain loop is to coordinate the rotation of the dial with the movement of the protractor blade. To further explain, rotation of the hand operated dial 70 in a clockwise direction will also cause a clockwise rotation of the protractor blade 12, and counterclockwise rotation of the dial 70 will cause a counterclockwise rotation of the protractor blade 12. Thus, by mounting the chain drive sprocket wheel 72 on the outside of the chain loop, the operator of the device 10 can easily coordinate in his own mind, the proper direction for rotating the hand operated dial 70.

The pointer 54 in addition to having a forward measuring edge 60, also has a rearward edge 61 which is stepped forwardly adjacent the bottom thereof to define a stepped edge 63 which is parallel to said rearward edge 61 (FIGS. 4 and 7). The elongated scale is calibrated in spaced increments $y$ of 1/64 inch defined by spaced indicia 65. The transverse dimension of the pointer 54 between the forward edge 60 and the rearward edge 61 is designed such that when the forward edge 60 is aligned with an indicia 65, the rearward edge 61 is spaced from its adjacent forward indicia a distance equal to two-thirds of the increment of calibration $y$, i.e. 1/96 inch. In this position the stepped edge 63 is spaced from the same adjacent forward indicia 65 by a distance equal to $y/3$. Therefore, the rearward edge 61 and stepped edge 63 provide vernier measurements by dividing the increments of calibration $y$ into increments of $y/3$. For example, when the rearward edge 61 is aligned with an indicia 65, the forward measuring edge 60 will be disposed a distance of two-thirds of the increment of calibration $y$ from its adjacent rearward indicia 65. When the stepped edge 63 is aligned with an indicia 65, the forward measuring edge 60 will be disposed a distance equal to one-third of the increment of calibration $y$ from its adjacent rearward indicia.

In the disclosed embodiment the pointer 54 has one step formed therein and the vernier measuring edges divide the increments of calibration into thirds. The pointer can be designed with more than one step for dividing any specific increment of calibration $y$ into smaller increments than thirds. The pointer of this invention satisfies the following formulas:

$T = ny - y/x$
$N = x - 2$
$S = y/x$ wherein T is the transverse dimension of the pointer between its forward measuring edge 60 and its rearward edge 61; $y$ is the increment of calibration of a scale which is to be divided into equal smaller division; $n$ is a whole number less than the number of increments; $x$ is the number of equal divisions into which the increment $y$ is to be divided; N is the number of steps which should be formed in the rearward edge 61 to divide each increment $y$ into $x$ divisions and S is the spacing between the rearward edge 61 and its adjacent stepped edge, and also the spacing between adjacent stepped edges.

In the preferred embodiment of this invention, the perpendicular distance $d$ between the cneter of the pivot pin 20 and the planar surface 49 of the interconnecting pin 44 is set at 10 inches. The elongated scale is 20 inches long, and is calibrated in increments $y$ of 1/64 of an inch from zero at the center to 10 inches at the right, and 10 inches at the left.

The operation of the angle measuring and setting device 10 will now be described. An aritcle, such as a machine part (not shown), having a surface, the angle of which is to be measured, is placed on the support platform 16. The hand operated dial 70 is then rotated either clockwise or counterclockwise depending upon which side of the protractor blade is article is placed. Rotation of the dial 70 rotates the swinging arm 18 and protractor blade 12 until the protractor blade engages the angled surface which is to be measured. In this position, the clamping screw 28 can be tightened to firmly lock the swinging arm in its set position, i.e., such as the position indicated at 76 in FIG. 5. The angle A (FIG. 5) is equal to the angle of rotation of the measuring edges of the protractor blade from its vertical position to the support platform 16) to its position in contact with the surface the angle of which is to be measured. The measuring edge 60 of the pointer 54 is directly aligned with indicia on the scale to permit a direct reading of the transverse movement of the slide member 42, and therefore the upper planar surface 49 of the interconnecting pin 44. The perpendicular distances d from the center of pivot pin 20 to the upper planar surface 49 of the interconnecting pin is known, and the transverse distance M can be directly read from the scale. Therefore, the angle A can be determined from a trigonometric table since $A = \tan^{-1} M/d$. Furthermore, since the distance d is precisely set at 10 inches, $A = \tan^{-1} M \times 10^{-1}$. Setting the distance d equal to 10 inches greatly simplifies the trigonometric calculations required to measure or set an angle. For example, to set an angle of 18°, 15 minutes, the tangent is first calculated to be 0.3295. Since the distance d equals 10, the measuring edge 60 of the pointer 54 should be set 3.297 inches (3 19/64) either to the right or to the left. To further explain, the setting on the scale 58 is determined by merely multiplying by 10 the tangent of the angle to be set.

Since the maximum distancec M that the sliding member can move to the right or to the left of center is 10 inches, the angular setting and measuring limitations of the device are 45° from the vertical, i.e. $\tan 45 = M/d = \frac{1}{2}$. To enable the angle measuring and setting device to be utilized for measuring or setting angles from 45° to 90°, a supplemental blade 80 is utilized. The supplemental blade 80 has a sleeve portion 82 and a body portion 84. The sleeve portion 82 has a longitudinally extending opening 87 therethrough which is adapted to insert over the protractor blade and fasten thereto by a suitable screw fastening device 85. The body portion 84 of the supplemental blade has a measuring edge 86 disposed at 45° to the longitudinal axis of the opening 87 in the sleeve. Therefore, when the protractor blade is substantially vertical, such as is shown in FIG. 2, the measuring edge 86 of the supplemental blade 80 will be disposed at an angle of 45° to the vertical. When the protractor blade is substantially vertical, such as is shown in FIGS. 1 and 2, the measuring edge 86 of the supplemental blade 80 will be disposed at an angle of 45° to the vertical. When the protractor blade is set to its maximum angular position of 45°, the measuring edge 86 will be disposed substantially parallel to the supporting platform.

FIG. 9 shows a second supplemental blade 80a which can be attached to the protractor blade to provide an enlarged article engaging surface 86a for contacting a surface of an article to measure the angle of said surface. Portions of the supplemental blade 80a corresponding to supplemental blade 80 have been designated by the same numeral with a suffix a for reference purposes. The enlarged engaging surface 86a is particularly useful in measuring a device having a compound angle. That is an article wherein the face to be measured inclines at an angle that does not align with either the longitudinal axis or transverse axis of the support platform 16. By providing the enlarged surface 86a, the inclined angular surface to be measured can be readily accommodated across the face of the surface 86a.

Although the angle measuring and setting device of this invention has been specifically described for use with a protractor blade, the device has other applications. For example, the swinging arm can be connected to milling machine vises for precisely setting angles of such vises. Also, the device could be utilized in setting the taper of a taper attachment on a lathe. The angle measuring and setting device can also be used for other applications wherein the setting or measuring of angles in a reliable manner is required.

Referring now to FIGS. 10–12, I show a modified type of measuring device 10a including a protractor blade 12a which extends through a slot 14a in the support platform 16a in the manner hereinbefore described. At the rear of the platform, a light reflector 98 is disposed to reflect the light rays generated by the elongated fluorescent tube 100 for protractor blade aligning purposes. Thus, when a workpiece (not shown) is placed upon the support platform 16a and the protractor blade 12a is moved into the correct angular alignment to measure an angled surface of the workpiece, the operator can more easily determine that the angle is being properly measured when no light from the reflector 98 is visible at the surface to surface junction between the between the measuring edge of the protractor blade 12a and the angled surface to be measured on the workpiece.

In order to provide a greater range of flexibility in measuring angles, I prefer to construct the modified scale 58a 20 inches in length, thereby making possible an angle whose tangent would equal the fraction 2/1 which would be approximately 64°. Right and left hand dials 70a are provided for either right handed or left handed operation of the protractor blade 12a. As a matter of convenience, the exact numerical tangent equivalents are set forth for each angle in the window 102 for ready reference by the operator. A turn knob 104 functions a rotating table which lists the decimal equivalent of each angle from zero through 64°. Function of the turn knob 104 rotates the desired angle decimal equivalent into registry with the window 102 for ready reference by the operator.

As best seen in FIGS. 11 and 12, the swinging arm 18a is fabricated to precisely a length of ten inches between its pivot 20a and its slide pin 44a for the same purpose as hereinbefore set forth. The arm 18a slides within the carrier 106 and is retained in sliding engagement therein by means of the carrier affixed roller bearings or ball bearings 108. Thus, upon pivotal movement arm 18a about its upper pivot 20a, the carrier 106 slides relative to the arm 18a about the bearings 108. The swinging arm 18a pivotally affixes to the sliding member 42a and is a pivotal connection therewith by means of the pin affixed ball bearing 110. Thus, as the swinging arm 18a pivots about the pin 20a, the arm will slide relative to the carrier 106 and the carrier itself will pivot with respect to the sliding member 42a, to thereby facilitate easy movement of the arm 18a. A plurality of rollers 112 journal within the sliding member 42a and roll upon the slide support bar 40a in a manner to prevent binding or other retarding effect.

An upper clamp 114 affixes to the swinging arm 18a above the carrier 106 and is generally channel-shaped to provide a longitudinal slot 116 defined between the web of the upper clamp 114 and the swinging arm 18a. A separate protractor blade 12a positions within the slot 116 and is vertically movable therein. An apertured cinching member 118 cooperates with a rotary cam 120 to bear against the side of the protractor blade 12a upon rotation of the cam 120. Thus, the protractor blade 12a may be readily locked in any vertical position simply by turning the cam 120 to first release the cinching member 118 and then rotating the cam 120 to urge the cinching member 118 against the side of the protractor blade 12a. Accordingly, the protractor blade 12a may be elevated or lowered with respect to the horizontal platform 16a to permit measuring the angular surfaces of hard to reach objects. A pointer 44a extends from the sliding member 42a which rides upon the slide support bar 40a in the manner hereinbefore described. The pointer 44a terminates outwardly in a vernier scale 122 for precise measurement in conjunction with the graduated longitudinal scale 58a in the manner hereinafter more fully set forth.

Referring now to FIG. 13, it will be seen that the scale 58a is divided into graduations equalling one-twentieth of an inch and the vernier scale 122 is divided into graduations equalling one-fiftieth of an inch. Thus, measurement of linear movement on the scale 58a is then possible to an accuracy of one - one-thousandths of an inch. As the slide 42a is moved to the right or to the left, the angle of the protractor blade 12a above the platform 16a is changed accordingly. After the protractor blade is moved to the exact corresponding angle of the workpiece (not shown) to be measured, the reading on the sliding vernier scale can then be taken. From a reading as accurate as one-one-thousandth of an inch, the measurement can be compared to the tangantial chart visible through the window 102 by turning the knob 104 until the correct tangential readings are shown. When the reading is found on the chart through the window 102, it will have direct reading giving an accurate angle of the parts.

In case the angle measured on a workpiece (not shown) is not the desired angle, the amount of material which must be removed to correct the angle can be easily and quickly obtained by using the present invention. For example, if the angle desired is 30°, and the initial measurement using the device 10 or 10a reads 5.890 on the vernier, a comparison with the angle chart showing in the window 102 would indicate an angle of 30°, 30 seconds. Reading the chart for the desired angle of 30° would indicate a vernier reading of only 5.773. Subtracting 5.773 which is the angle desired from 5.890 which is the actual angle existing, would give a reading of 0.117. To correct this reading for a 10-inch arm, move the decimal point one place to the left to have a reading of 0.0117 for each inch of workpiece. Once this figure is obtained, multiply it by the height of workpiece. For example, if the piece were 2 inches in height, the number to be calculated would be 2 × 0.0117 which equals 0.0234 inches. This figure would then be the exact amount to be removed from one side of the workpiece to correct the angle.

In addition to the above measurements, the device is also useful in laying out angles on parts to be machined or cut. This represents an advancement in machine angle work.

I claim:

1. A device for measuring and setting angles comprising
   A. a frame including a fixed support;
   B. a horizontally disposed scale of rectilinear shape affixed to the frame below the fixed support;
   C. an arm connected by a pivot pin to the fixed support, said arm having a longitudinal axis and being pivotable from a first position which is vertical to a second position, which is angularly offset from the vertical, through an angle to be measured,
   D. an indicating means mounted for movement adjacent the scale,
      1. the indicating means comprising a sliding member mounted for sliding movement, a pointer connected to the sliding member and overlying the scale, and an interconnecting pin being fixedly connected to the sliding member;
   E. interconnection means for connecting said indicating means to said arm, said interconnection means comprising,
      1. a longitudinally extending slot in said arm,
         a. said slot being tapered in a direction away from the pivot pin,
      2. the interconnecting pin extending into said slot,
         a. the portion of said interconnecting pin which extends into the slot having opposed edges that engage opposed longitudinally extending walls of the slot throughout the entire movement of the arm from the first position to the second position,
   F. angle setting means for pivoting said arm both clockwise and counterclockwise,
      1. said angle setting means comprising a chain and a pair of spaced, freely rotatable sprockets mounted on said frame, said chain being disposed in a loop about the sprockets,
         a. said chain having opposed ends, connecting means for fastening said opposed ends to opposite sides of the slide member, and means connected to the sprockets for rotating said chain in a clockwise and a counterclockwise direction for traversing the slide in opposite directions to thereby pivot the swinging arm in both clockwise and counterclockwise directions from said first position.

2. The device according to claim 1 further comprising locking means for locking the arm in any desired pivotal position, said locking means being mounted upon the frame below the pivot pin.

3. The device according to claim 2 comprising a longitudinally extending protractor blade connected to said arm at the pivot pin, said protractor blade having a longitudinal axis in direct alignment with the longitudinal axis of the arm, and further including a support platform having a slot formed therethrough, said support platform being disposed immediately above said pivot pin and being mounted on the frame, said protractor blade projecting through the said slot.

4. The device according to claim 3 further including an angle adapter comprising a longitudinally extending sleeve portion and a body portion, said sleeve portion defining a longitudinally extending opening for receiving said protractor blade therein, said body portion having an edge disposed at an angle of 45° to the longitudinal axis of said opening.

5. The device according to claim 4 further including locking means for firmly securing said angle adapter to said protractor blade, said locking means including a screw fastening device which acts through the sleeve portion to engage the protractor blade.

6. An angle measuring device including
   A. a frame;
   B. a support platform carried by the frame;
   C. an upper pivot pin secured to the frame directly below the support platform,
      1. said pivot pin having a center;
   D. a swinging arm pivotally supported from the pivot pin,
      1. said swinging arm including means to lock the swinging arm in positions angularly offset from the vertical;

E. a carrier engaged over the swinging arm, said carrier having longitudinal sliding movement relative to the swinging arm,
  1. said carrier including a slide pin projecting therefrom,
    a. said slide pin supporting a ring shaped ball bearing thereabout;
F. a scale affixed to the frame below the pivot pin,
  1. said scale being horizontally disposed for angle measuring purposes;
G. a sliding member pivotally affixed to the carrier at the said ball bearing,
  1. said sliding member being movable over the scale,
  2. said sliding member carrying a vernier scale, said vernier scale being movable in juxtaposition to the horizontal scale for angle measurement purposes when the arm is pivoted; and
H. a protractor blade extending upwardly from the swinging arm,
  1. the said support platform being provided with a slot and the said protractor blade projecting upwardly through the slot for workpiece angle measuring purposes,
  2. said protractor blade having a workpiece contacting edge in longitudinal alignment with the swinging arm.
I. a supplemental blade associated with the protractor blade,
  1. said supplemental blade including means to affix the supplemental blade to the protractor blade and means to remove the supplemental blade from the protractor blade,
  2. said supplemental blade having a measuring edge which is disposed at an angle of 45° from said workpiece contacting edge.

* * * * *